L. W. JONES.
METHOD OF TREATING PIPE BALLS.
APPLICATION FILED JAN. 6, 1910.

1,036,635.

Patented Aug. 27, 1912.

WITNESSES.
J. R. Keller
Robert C. Totten

INVENTOR,
Llewellyn W. Jones
By Kay & Totten
Attorneys

UNITED STATES PATENT OFFICE.

LLEWELLYN W. JONES, OF SEWICKLEY, PENNSYLVANIA.

METHOD OF TREATING PIPE-BALLS.

1,036,635.  Specification of Letters Patent.  Patented Aug. 27, 1912.

Application filed January 6, 1910. Serial No. 536,700.

*To all whom it may concern:*

Be it known that I, LLEWELLYN W. JONES, a resident of Sewickley, in the county of Allegheny and State of Pennsylvania, have invented a new and useful Improvement in Methods of Treating Pipe-Balls; and I do hereby declare the following to be a full, clear, and exact description thereof.

My invention relates to method of treating pipe-balls. These pipe-balls are employed in connection with the manufacture of lapweld tubing and are usually made of cast iron or cast metal. These pipe-balls have to be cast in sand molds, and while they may be cast with considerable accuracy, yet it is very difficult to get them uniformly accurate in size due to slight irregularities or imperfections in the mold, as well as the difference in the shrinkage of the metal, which result in corresponding imperfections in the castings and variations and non-uniformity in size. When once cast it has not been deemed expedient to attempt to remove any imperfections or inaccuracies in size or shape by process of turning or otherwise removing the skin of the casting, for by the removal of the skin the inner structure of the metal is so exposed that when the ball is used in the welding of the pipe, the pipe is liable to weld or stick to the ball, with the result that the pipe is worthless, and has to be turned into scrap. Furthermore, after use the pipe-balls become covered with scale, slag and other foreign material and have to be cleaned before using.

The object of my invention is to provide a method of treating these pipe-balls, after they have been cast, so as to remove any irregularities or variations in the surface without destroying the skin and thereby producing a pipe-ball which has a smooth regular surface and is uniform in contour, so that the pipe formed therefrom will be accurate in size, and at the same time the life of the pipe-ball is extended.

A further object is to remove the scale or other foreign matter adhering to the balls after they have been used.

To these ends my invention consists, generally stated, in the method of treating pipe-balls consisting in subjecting the surface of the ball to a percussive action, the blows being administered in quick succession all around the ball so as to remove any irregularities in the shape, or excrescences.

In the accompanying drawing, I have illustrated a simple form of apparatus for carrying out my improved method in which—

Figure 1:
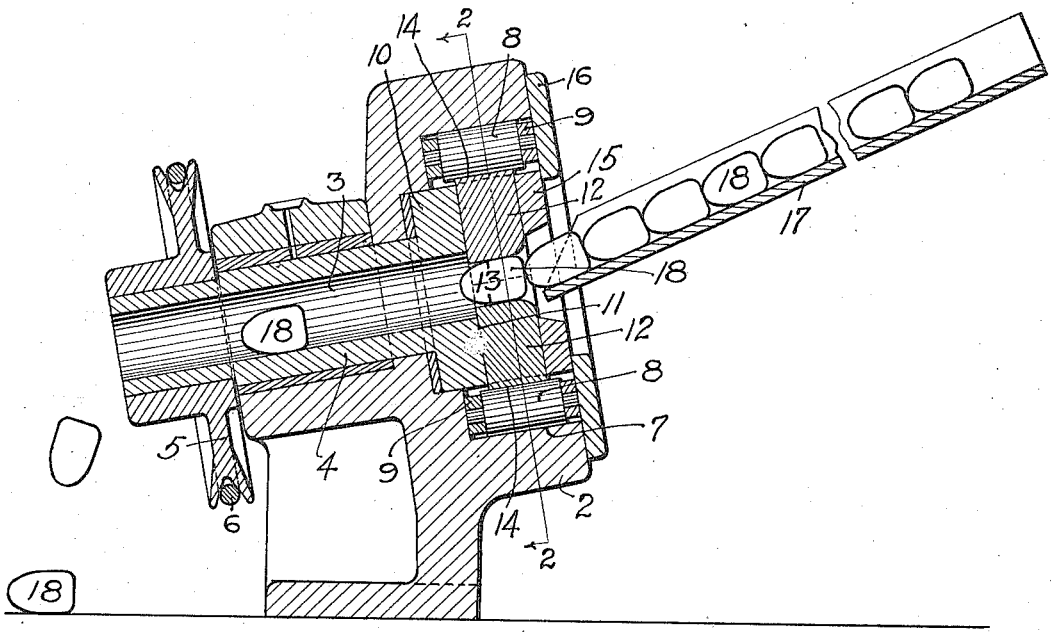
Figures 2, 3, 4:
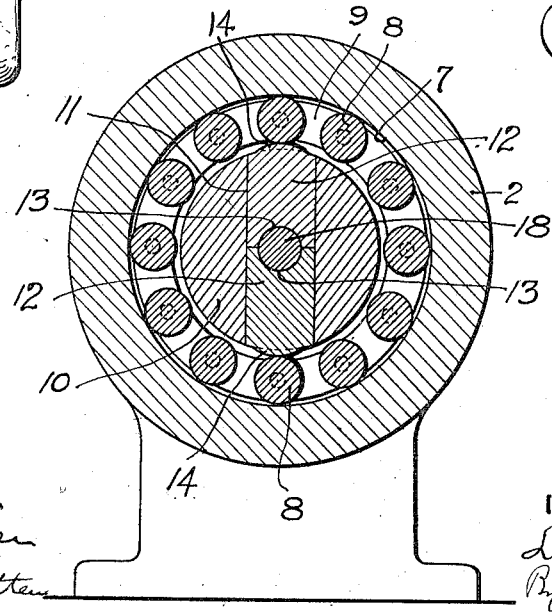

Figure 1 is a sectional elevation of such apparatus; Fig. 2 is a cross section on the line 2—2 Fig. 1; Fig. 3 is a view of a pipe-ball in the rough; and Fig. 4 is a view of the pipe-ball after being treated by my improved method.

In the drawing, the numeral 2 designates a suitable frame or casting which has the cylindrical bore 3 to receive the hollow shaft 4. The bore 3 is arranged at a slight inclination for the purposes hereinafter set forth. A pulley 5 is mounted on the shaft 4, which may be driven by a suitable belt 6. The casting 2 has the cylindrical recess 7 and arranged within said recess are the rollers 8 which are supported in the ring bearings 9. The head 10 of the hollow shaft 4 has a groove or mortise 11 formed therein to receive the dies 12. These dies 12 have the semicircular grooves 13, and these combined grooves form an opening to receive the pipe-ball to be treated as hereinafter set forth. The outer ends of the dies are slightly rounded as at 14 and as the hollow shaft 4 rotates, these rounded portions 14 of the dies come in contact with the rollers 8 in quick succession and a percussive action is imparted to the pipe-ball contained within the dies. A cap-plate 15 is secured to the end of the shaft 4 to retain the dies in position, and the ring-plate 16 is secured to the casting 2. A chute 17 may be arranged in suitable position with reference to the dies so that the pipe-balls fed to such chute will slide down the same and enter the dies by the action of gravity.

In practising my invention with the above apparatus, the pipe-ball 18, in its rough form as taken from the mold, may be heated if desired, and the pipe-ball is fed to the chute 17 whence it passes down into the dies 12. Preferably the pipe ball is cast slightly larger in diameter than the finished ball so that when subjected to the percussive action, as hereinafter set forth, the diameter of the ball is reduced to the desired size, while at the same time the surface is compressed to give a smooth finished surface. The pipe-ball being substantially in the shape of a projectile with a conical end is readily guided into the dies and the exterior or anvil portion of the pipe-ball beyond the conical portion and the part on which the pipe is formed, is subjected to the action of the dies. The shaft 4 is rotated at a high rate of speed and a blow is administered to the pipe-ball each time it comes in contact with one of the rollers 8. As a consequence the blows are administered in quick succession to the pipe-ball in its passage through the dies, and all irregularities or excrescences are removed by this hammering action while at the same time the cast skin is preserved and the surface metal compacted so that the inner structure of the casting is not exposed, and a hard, smooth, compact surface is given to the ball, and the ball is trued up to accurate size and dimensions. By casting the pipe ball a little larger and truing it down by this hammering operation, said ball is given the desired size while at the same time the correct cylindrical form is given to the anvil portion of the ball which is most essential to make a perfect pipe. After the balls have been used they may be again introduced into the machine and the percussive action will act to remove the scale, slag and other foreign matter adhering to the surface.

It has been found desirable in some cases to coat the pipe-balls before using with plumbago, graphite, or like substance in order to fill up any depressions or cavities in the surface of the ball as well as to act as a lubricant. By my method I coat the balls with such graphite or other suitable material of a refractory character before passing it through the machine and the percussive action acts to hammer or force the graphite into any such depressions or cavities. This gives a coating which prevents the welding of the pipe to the ball and the spalling of the ball which acts to cut or tear the pipe.

What I claim is:

1. The method of treating cast metal pipe-balls, consisting in subjecting the outer original surface thereof to a percussive action.

2. The method of treating cast metal pipe-balls, consisting in subjecting the outer original surface of the ball to uniform blows administered in quick succession.

3. The method of treating cast metal pipe-balls, consisting in subjecting the original exterior working surface of the ball to a percussive action at all points simultaneously.

4. The method of treating cast metal pipe balls, consisting in subjecting the original exterior working face of the ball to a percussive action and reducing the diameter of the ball thereby.

5. The method of treating cast pipe-balls, consisting in coating the original surface of the ball with a refractory material, and subjecting the ball to percussive action to cause the material to adhere thereto.

In testimony whereof, I the said LLEWELLYN W. JONES have hereunto set my hand.

LLEWELLYN W. JONES.

Witnesses:
ROBERT C. TOTTEN,
JOHN F. WILL.